United States Patent

[11] 3,549,878

[72] Inventor Richard E. Bailey
Miami, Fla. (429 Montgomery Ave., Apt. C202, Haverford, Pa., 19041)
[21] Appl. No. 758,528
[22] Filed Sept. 9, 1968
[45] Patented Dec. 22, 1970

[54] LIGHT DISTRIBUTION SYSTEM
13 Claims, 11 Drawing Figs.

[52] U.S. Cl. .......... 240/10, 240/59, 240/9, 240/6.4
[51] Int. Cl. .......... F21v 21/00, F21v 1/00
[50] Field of Search .......... 240/10, 10C, 59

[56] References Cited

UNITED STATES PATENTS

| | | | |
|---|---|---|---|
| 1,030,516 | 6/1912 | Legarde et al. | 240/6.4WAL |
| 2,931,893 | 4/1960 | Gonzalez Arius et al. | 240/6.4WAL |
| 2,962,580 | 11/1960 | Jones | 240/6.4WAL |
| 3,008,038 | 11/1961 | Dickens et al. | 240/6.4WAL |

*Primary Examiner*—John M. Horan
*Assistant Examiner*—D. J. Clement
*Attorney*—John Cyril Malloy

ABSTRACT: A light distribution system adapted for use to distribute a pattern of light over the clothing of a wearer. Also, a color control mechanism may be utilized in combination with the light distribution system to vary the color of the light distributed by the pattern. The device is useful, for instance, by a dancer to vary the color of the light in timed sequence with music. The control of the light color is by means of a transducer included in a circuit in the color control mechanism to cyclically move a color filter through the path of light delivered to the system to change the color of it.

INVENTOR.
RICHARD E. BAILEY
BY John Cyril Malloy
ATTORNEY.

INVENTOR.
RICHARD E. BAILEY
BY
John Cyril Malloy
ATTORNEY.

LIGHT DISTRIBUTION SYSTEM

This invention relates to a light distribution system and to a color control mechanism for selectively changing the color of the light delivered by the system.

It is an object of this invention to provide a light distribution system which is particularly adapted for use in combination with an article of apparel and which is adapted to deliver light from a source carried by the wearer and to divide the light into a plurality of secondary light distribution points.

It is another object of this invention to provide a light distribution system in combination with a color control mechanism whereby the light delivered by the system may be varied.

A further object of this invention is to provide a portable colored light distribution system and pressure actuated control means therefor whereby the colors emitted by the system can be varied in accordance with the manipulation of pressure actuated switches.

Another object of this invention is to provide a color control mechanism for changing the colors emitted by a light distribution system wherein a transducer is employed to convert electrical energy, controlled by pressure responsive switches, to mechanical energy to actuate a multicolor filter to provide light patterns which vary in color in accordance with the sequence of actuation of the switches.

Still another object of this invention is to provide a light distribution system and color control means therefor wherein light emitting devices secured to a performer's costume may be illuminated, and wherein the color of the light transmitted thereto can be varied in response to the actuation of pressure operated switches secured to the performer's shoes.

Another object of this invention resides in a provision of a dancer's costume having a light distribution system associated therewith, and wherein a color control mechanism is provided for changing the color of the lighting supplied to various portions of the costume in accordance with a sequence of operation of pressure actuated switches.

Another object is to provide light distribution system embodying color control mechanism wherein interesting patterns of varying light color changes can be produced by a relatively simple mechanism which may be manufactured economically, and which requires very little maintenance in its operation.

In accordance with these and other objects which will become apparent hereinafter, the instant invention will now be described with reference to the accompanying drawings in which.

Figure 1:
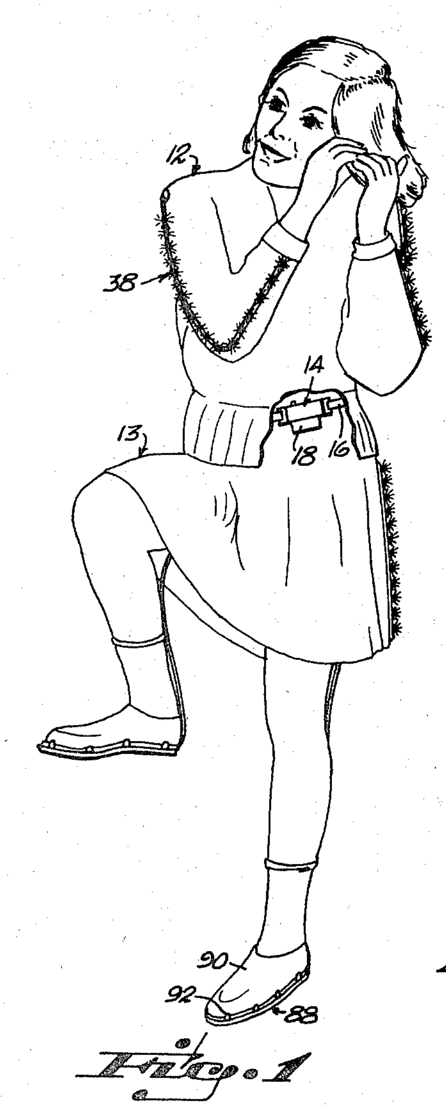
FIG. 1 is an elevational view of a dancer with a costume equipped in accordance with my invention.

Referring to the drawings wherein like reference characters designate the like or corresponding parts throughout the various views and referring particularly to FIG. 1, there is shown a figure of a person, in this case, a dancer, on which there is an article of clothing, for instance that designated by the numeral 12 or the numeral 13. The light distribution system and the color control means will be described separately in the following paragraphs.

The light distribution system includes a housing 14 arranged for instance, on the belt 16 of the wearer. Within the housing an energy source or battery 18 is provided together with a light bulb or other light source 20 in a circuit indicated by the conductor 22 preferably in series with a master switch 24. These elements may be seen on reference to FIG. 8 and FIG. 11, the latter FIG. constituting a circuit diagram. Light guide means are provided to distribute the light from the primary source or the light bulb 20 to a plurality of secondary light distribution points spaced from one another and preferably distributed in a pattern on the article of apparel, such as along the arm of the blouse or sweater 12. The light guide means constitutes a bundle of flexible elongated plastic members or filaments, the bundle being designated by the numeral 26. The individual filaments being shown in FIG. 5 and one of the filaments being designated by the numeral 28. The collection of filaments of the bundle are separate fibers of plastic material such as polymethyl methacrylae sold commercially under the trademark, Lucite of the E. I. duPont deNemors Company, preferably the individual or constituent elements of the bundle are of a diameter in the order of about 10-mils. The filaments are generally parallel to one another in the bundle, however, some twist may characterize the filaments which are therefor characterized as having a randomly bundled condition. The bundle terminates at one end, as seen in FIG. 5, in an end face 30 in which each of the filaments or constituent elements of the bundle are seen in a substantially full cross-sectional presentation. The bundle is provided with an exterior jacket of a suitable plastic material, such as polyethylene resin 32 to generally maintain the orientation of the filaments. Preferably each of the filaments is sheathed with a transparent polymer of a lower refractive index than that of the material of the filament. The filaments are variable in length from the end 30 and are turned outwardly such as the reference filament 28 in FIG. 4 and passed through the jacket 32 of the bundle terminating in a projecting length 28′ extending generally radially outwardly of the bundle jacket.

Figure 2:
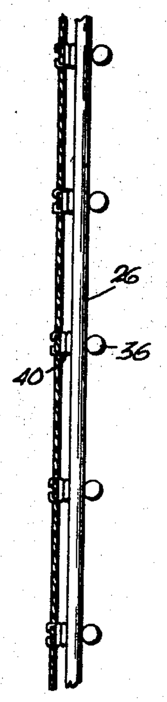
FIG. 2 is a fragmentary sectional view showing one form of light emitting device in assembled relation on a portion of the costume.
Figure 3:
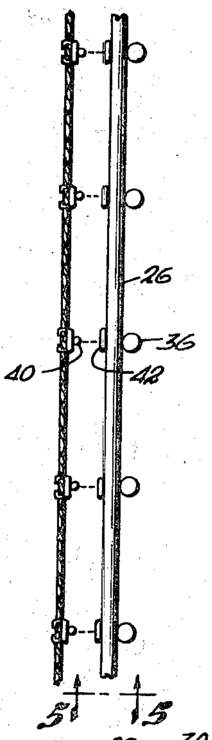
FIG. 3 is a view similar to FIG. 2 showing the light emitting device in separated relation with respect to the costume.
Figure 4:
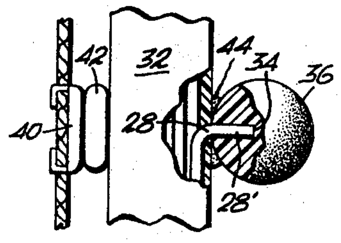
FIG. 4 is an enlarged part-sectional view illustrating one of the light emitting devices of FIG. 2.
Figure 5:
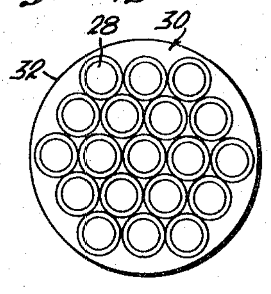
FIG. 5 is a view taken along the line 5–5 of FIG. 3 showing a group of light guide members used to transmit-colored filtered light from a light source to the light emitting devices on the dancer's costume.

As indicated, in FIGS. 2, 3, and 4, each of the filament ends, such as that designated by the numeral 28′ are preferably spaced from one another and the terminal end face 34 constitute a point of delivered light from the primary source. A light-diffusing element, such as that indicated by the numeral 36 is preferably provided on the terminal end of each of the filaments to diffuse the light and increase the effective lighted area of the secondary light emission.

Figure 11:
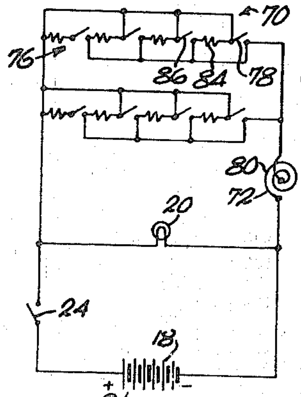
FIG. 11 is a wiring diagram illustrating the manner in which electrical resistances actuated by the foot pressure-operated switches of FIGS. 6 and 7 are connected to change the color of light transmitted to the light emitting devices on the dancer's costume as illustrated in FIG. 1.

Referring to FIG. 1 and FIG. 11, it is thus seen that when the master switch 24 is closed, current will flow from the battery 18 through the light source 20 and, in so doing, the primary light will be subdivided through the light guide means just described to a plurality of secondary light distribution points arranged in a pattern such as in the line form 38 on the sleeve of the blouse 12 in FIG. 1. The light distribution points may be of an enlarged area by reason of the diffuser means 36 arranged there around.

The bundle may be of the material sold by the E. I. duPont deNemors Company under the trademark Crofon light guides and it is noted that light guides of this type are preferred because the material of which they are constituted, which is the same as that specified chemically above, remains tough and flexible to a temperature range from minus 40° F. to a maximum continuous service temperature of approximately 175° F., with intermittent exposures to temperature being acceptable up to 250° F., whereby an article of clothing including the light distribution guide means may be washed. It is further of significance that the previously described plastic is preferred for the reason that the bundles are adapted to be flexed and bent around small radii and subjected to repeated cyclical flexing and movement without damage to the light distribution pattern sought to be achieved.

While in the preferred embodiment it is desirable to include the light guide means within the garment structure and to secure it permanently thereto, the garment may be provided with means to connect, 40 the light distribution or guide means to the garment. For instance, as seen in FIG. 3, a plurality of snaps 40 are provided which engage a companionate portion 42 arranged along the length of the bundle 26 as is seen in FIG. 4, this snap means composed of the portions designated by the numerals 40 and 42, may be provided in combination with the diffuser element 36 which is secured to the bundle surface by suitable adhesive such as that indicated by the numeral 44.

Thus, the distribution system for the light is adapted to be separated from the article of apparel with the article of apparel being washed separately or, as explained above, it may be utilized as an integral portion of the garment with the separation being effected merely by removing the end 30 from the frame or housing of 14, to which we now make further reference.

Figure 8:
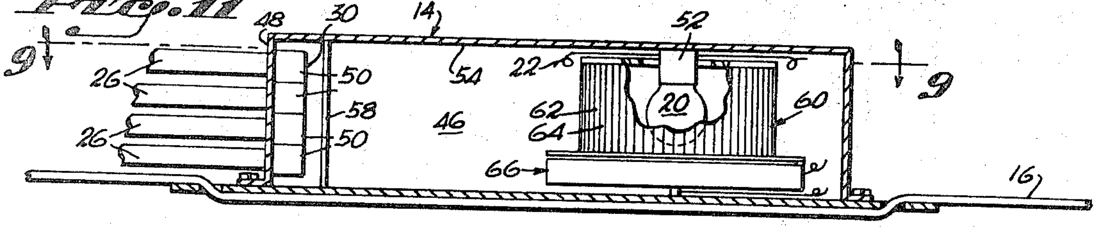
FIG. 8 is a sectional view, partly in elevation, of the light controlled unit worn by the dancer.

Referring to FIG. 8, it is seen that the housing 14 defines an interior chamber 46 and that one end face 48 comprises a plate having a plurality of apertures through which the ends of a plurality of bundles are passed so as to be in a stack, as indicated in FIG. 8, with the terminal end portions 50 being arranged symmetrically with respect to the median plane of the housing. The light source 20 is carried in a socket 52 which positions the light bulb 20 in a plane common to that of the stack and spaced therefrom within the housing 14, which is of opaque material and which may have an inner face 54 of reflective material. It is thus seen that when the light is energized, the chamber 46 is intensely illuminated. A septum or shield is arranged adjacent the stack of the end portions 50 of the light guide means, the said septum having a slot 58 also symmetrically arranged with respect to the vertical median plane, whereby light rays from the light bulb 20 are confined within the chamber 46 with the exception of those which are permitted to pass through the slot 58 to impinge upon the end faces 30 of the bundle or bundles 26 for distribution to the secondary stations.

In a preferred embodiment, means are provided to control the color of the light presented to the light distribution bundles or light guide means. The color control mechanism may be of various types, that to be described includes a multicolor light filter 60 which is arranged laterally across the path of the light rays from the light source 20 through the slot 58 to the end face 30. The color filter is adapted to be moved laterally across the path to vary the color presented to the light guide means. In the embodiment shown, the color filter is of cylindrical form circumposed about the light bulb 20 with the filter 60 being composed of a plurality of discrete adjacent circumferentially arranged multicolored segments which extend vertically in alignment with the stack of the end portion 50. In the embodiment shown in FIG. 8, means are provided generally designated by the numeral 66 to move the filter 60. These means, which may be of any suitable form, will now be described with reference to the circuit diagram of FIG. 11.

Figure 9:
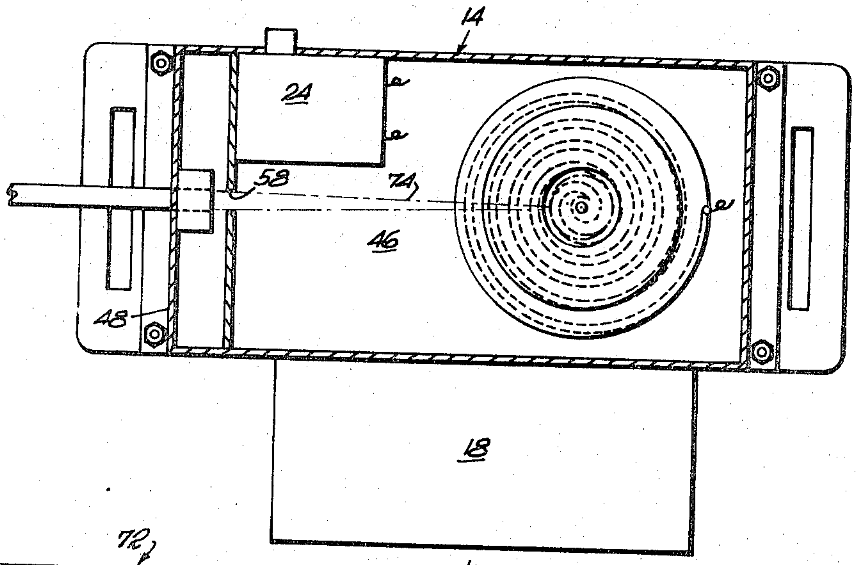
FIG. 9 is a sectional view taken substantially on the line 9–9 of FIG. 8 and looking in the direction of the arrows.

Referring to FIG. 11 it is seen that in parallel with the light bulb 20, a secondary circuit designated by the numeral 70 is provided. A transducer 72 is included in this circuit. In response to current flow, the transducer is adapted to convert electrical energy into mechanical energy to move the filter 60 with respect to the beam or path indicated by the numeral 74 in FIG. 9. It is thus seen that so long as the transducer is energized, the delivered color of the light may be caused to continuously change.

As an additional dimension, the color of the light may be varied in a generally predetermined pattern of rhythmic changes, such as would harmonize with music being played simultaneously, as will now be explained. The means to vary the movement of the segments 62 and 64 of the color filter with respect to the light beam 74 may include a control means 76 and two embodiments of the same are shown in the drawings, a first embodiment, composed of a bank of switches 78 in combination with a piezo electric spiral 80, as seen in FIG. 11, or the alternative embodiment of FIG. 10, which, as will be explained hereafter, constitutes a variable solenoid 82.

Referring to the type of transducer indicated by the numeral 80, which is of the type known as a bender transducer such as that manufactured by Gulton Industries, Inc., under the trademark Glennite Piezoceramics. In the preferred embodiment to achieve rotary motion as opposed to pure lateral motion of movement of the filter segments across the beam, a spiral form of piezo electric ceramic material may be employed. The piezo ceramic spiral 80 is responsive to current flow in the circuit 70 and to variations of available electrical energy from the secondary circuit 70. The bank of switches 78 are adapted to alter the amount of available energy to the spiral 80.

The bank of switches 78 are in series with the spiral 80 and constitute a plurality of separate switches each in series with an associated resistor element 84 with the combination of the resistors and switch arms 86 being in parallel with one another. Thus it is seen that the voltage of the circuit 70 is adapted to be varied by manipulation of the switches.

Figure 6:
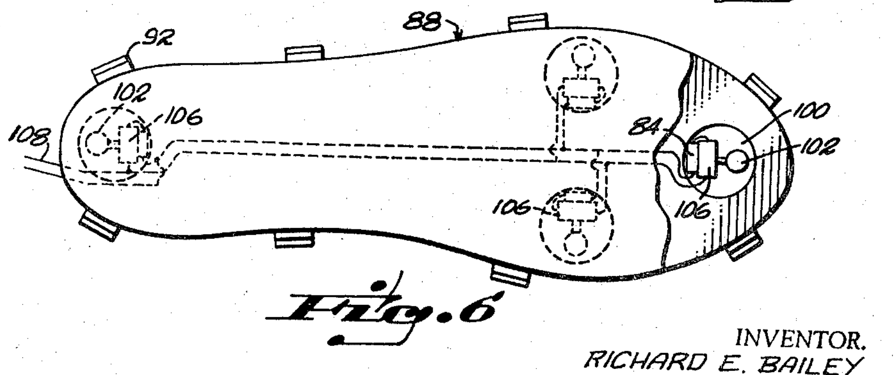
FIG. 6 is a view of the bottom of a dancer's shoe which has been broken away to show the pressure actuated switches for controlling the color of light transmitted by the light emitting devices on the dancer's costume.
Figure 7:
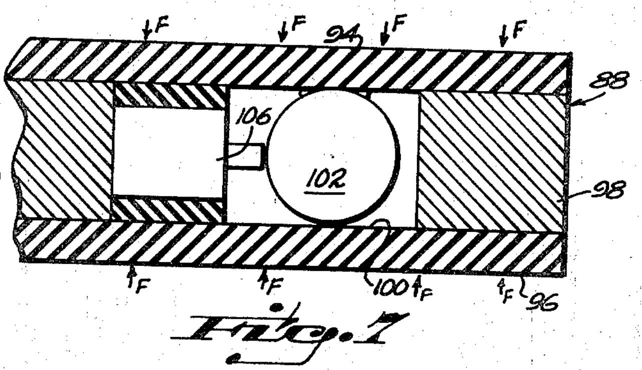
FIG. 7 is an enlarged sectional view illustrating the pressure actuated switch in the footwear illustrated in FIG. 6.

Finally, means are provided to operate or actuate the switch arms 86. Referring to FIG. 6, it is seen that a switch carrier pad 88 is provided which is preferably sized to underlay the shoe 90 of a dancer, and to be clamped thereto by means of clamp means 92. The pad 88 carries the switch-actuating portion and will now be described on reference to FIG. 6 and FIG. 7. The upper surface 94 of the pad 88, which underlies the sole 90 of the shoe of the wearer provides one side of a sandwich, with the floor engaging portion or sole 96 of the pad 88 constituting the other side. An intermediate portion of yieldable rubbery material 98 is provided and a pocket 100 is defined within the lip layer of rubbery material 98 and between the upper surface 94 and the sole 96 of the pad. Confined within the pocket is a deformable body, preferably of spherical form as indicated by the numeral 102 which, by reason of being captivated within the pocket 100 is constrained, in response to pressure as indicated by the arrows F to elongate tending to a horizontal plane to bear against a plunger of a miniature switch 106. A plurality of such switches and actuating means are arranged in a predetermined pattern within the pad 88. Each of these switches is electrically connected as by the conductor 108 to one of the switch arms 86 of the bank 78.

Thus, it is seen that as a wearer manipulates the foot, the movement of the color filter 60 relative to the effective light or beam 74 is varied whereby the user may effectively cause an interesting pattern of light which harmonizes with the music to which the dancing activity takes place.

The bundle size, that is, the number of constituent elements or fibers is preferably in the order of about 16 and within the range of between 15 and 20. The material should be such and the diameter such that their breaking strength in pounds will be over 10 so as to withstand the strain to which it can be expected to be subjected in laundering and in use. For instance, a policeman's jacket will be rendered highly flexible and illuminated for use in directing traffic at dark intersections through such a device. It is thus seen that this invention provides a highly portable, lightweight self-contained combination for use in distributing light, preferably in a predetermined pattern, from a primary light source to a plurality of secondary stations for light distribution, in situations where relative movement occurs between the secondary stations and the primary light station. While the use of sheaths to completely cover the filament or light guide cores are preferred to direct or maintain the column of light being directed in substantial coincidence with the filament, variations in sheathing may be employed, or the sheath may be eliminated.

Figure 10:
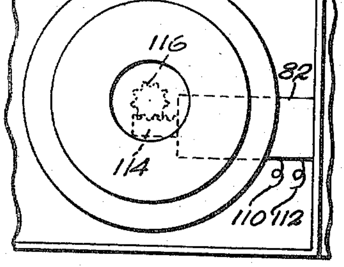
FIG. 10 is a fragmentary elevational view illustrating a modified form light control mechanism.

Referring now more particularly to FIG. 10, a modified form of transducer 72 is illustrated for converting electric energy from the battery or energy sources 18 into mechanical energy to actuate the multicolor light filter 60. The variable solenoid 82 has a coil of wire in the form of a long cylinder and a movable core is drawn into the cylinder when current flows through the coil. The coil is operably connected to electric leads 110 and 112 with the control means 76 of the secondary circuit 70. The variable solenoid 82 is interposed in the circuit in lieu of the piezoelectric ceramic spiral 80 as seen in FIG. 11. The movable core of the variable solenoid 82 is operably connected to drive a rack 114 meshing with a pinion 116 operably connected to rotate the multicolor light filter 60 in proportion to movement of the rack 114. As the amount of electrical energy supplied to the solenoid 82 is varied by operation of the bank of switches 78 in the secondary circuit 70, the rack 114 is actuated, one way or the other, to rotate pinion 116 and with it the multicolor light filter 60 to vary the color to which the terminal ends of the individual filaments 28 of the bundle of light-transmitting devices are subjected.

While this invention has been described with particular reference to two illustrative examples of transducers for converting electric energy into mechanical energy, it will be apparent that any suitable means may be employed for actuating the multicolor light filter 60 in accordance with actuation of the secondary circuit 70 operated for example by the variation of pressure of the dancer's feet.

I claim:

1. In combination, a light distribution system and color control means:

A. said system including:

a. a housing;

b. a source of electric energy;

c. a light bulb in the housing and circuit means connecting the bulb and the source;

d. a switch in series with the source and the bulb;

e. a plurality of spaced light-emitting devices;

f. a plurality of elongate light guides all arranged with a common end in a group in light-receiving relation adjacent the light bulb and each of the guides terminating at one of said light-emitting devices;

g. each of said light guides comprising a continuous filament of transparent flexible plastic material;

h. a cylindrical light color filter rotatably mounted in the housing and adjacent the common ends of the light guides of said group, said filter being circumposed about the light bulb and including a plurality of adjacently disposed, circumferentially spaced variable color segments; and B. said color control means comprising:

a. means to rotate the color filter to move the color segments across the light path between the light bulb and said common ends;

b. said color control means including a transducer to convert electrical energy from the electric circuit to mechanical energy;

c. a device responsive to variations of current intensity in the electric circuit to rotate the color filter;

d. means to vary the current flow in said circuit;

e. mechanical means connecting the current intensity responsive device and said color filter;

f. said current varying means comprising a plurality of switches and resistances in the circuit between the source of electric energy and the current intensity responsive devices; and g. each of said switches comprising a pressure operated switch arm in series with an electrical resistance interposed in said circuit between the source of electric energy and the current intensity responsive device to vary the electrical resistance in the circuit to rotate the light filter in response to variations in the resistances to vary the color of the light delivered through the light guides to the light-emitting devices.

2. The combination as set forth in claim 1 wherein said color control means includes a light shield arranged in said housing intermediate said color filter and the common end to direct light rays from the bulb to the common end of the group.

3. The combination as set forth in claim 1 wherein said device responsive to variations of current intensity in the electric circuit comprises a piezoelectric ceramic spiral.

4. The combination as set forth in claim 1 wherein said cylindrical light color filter includes a rotatable base for the light color filter and said mechanical means interconnects said base and said current intensity responsive device.

5. The combination as set forth in claim 3 wherein the axis of the piezoelectric ceramic spiral is parallel to and coaxial with said rotatable filter.

6. The combination as set forth in claim 5 wherein the inner end of said ceramic spiral is mounted to the rotatable filter base and the inner end is anchored with respect to the rotatable filter base.

7. The combination as set forth in claim 6 wherein the outer end of the piezoelectric ceramic spiral is operably connected to the rotatable filter end and is operable to rotate the filter approximately one full revolution when the current intensity is varied through the full range controlled by said switches.

8. The improvement as set forth in claim 7 wherein the combination is adapted to be carried on a person and the switches are adapted to be housed in the shoes of a wearer, said switches being of plunger actuated type and including deformable resilient members responsive to variations in pressure to actuate the plunger operated switches.

9. The invention defined in claim 1 wherein each of the light guides of the light distribution system is provided with an opaque sheath completely covering the length of each filament to confine light rays to longitudinal travel and to prevent diffusion of the light rays travelling along each of the guides.

10. The improvement as set forth in claim 1 wherein the device responsive to variations of current intensity in the electric circuit to actuate the rotatable light filter includes an electrically actuated solenoid.

11. The invention defined in claim 1 wherein the transducer is a solenoid having a cylindrical coil and a movable core slidably mounted in the coil, and electrical connecting means between the coil and the current-varying means.

12. The invention defined in claim 11 wherein the movable core of the solenoid is operably connected to a rack, and pinion means to rotate the light filter.

13. In combination, an article of wearing apparel and a light distribution system:

said light distribution system including;

a. a carrier;

b. a source of electric energy in said carrier;

c. a light bulb carried by said carrier and circuit means connecting the bulb and the source, and switch means in series with the source and the bulb; and d. a plurality of elongate flexible light guides of plastic material arranged in a bundle having a common end in light receiving relation adjacent the light bulb and each of the guides terminating at a spaced point on the outer surface of the article of wearing apparel, each of said light guides comprising a continuous filament of flexible plastic material and adapted to transmit light rays from the common end to the spaced distal ends.